(12) United States Patent
Walaszek

(10) Patent No.: US 12,271,228 B2
(45) Date of Patent: Apr. 8, 2025

(54) SYSTEM AND METHOD FOR PROCESSING AUDIO SIGNALS

(71) Applicant: Marek Walaszek, Warsaw (PL)

(72) Inventor: Marek Walaszek, Warsaw (PL)

(*) Notice: Subject to any disclaimer, the term of this patent is extended or adjusted under 35 U.S.C. 154(b) by 0 days.

(21) Appl. No.: 18/129,587

(22) Filed: Mar. 31, 2023

(65) Prior Publication Data

US 2023/0315151 A1  Oct. 5, 2023

(30) Foreign Application Priority Data

Mar. 31, 2022 (EP) .................................... 22166126

(51) Int. Cl.
*H04L 27/00* (2006.01)
*G06F 1/16* (2006.01)
*H04B 1/00* (2006.01)
*H04R 5/04* (2006.01)

(52) U.S. Cl.
CPC ......... *G06F 1/1633* (2013.01); *H04B 1/0039* (2013.01); *H04R 5/04* (2013.01)

(58) Field of Classification Search
CPC ...... H04B 1/30; G10H 1/0008; G10H 1/0091; G10H 10/155; G06F 3/011; G06F 3/017; G06F 3/16
USPC ......................................................... 375/316
See application file for complete search history.

(56) References Cited

U.S. PATENT DOCUMENTS

| | | | |
|---|---|---|---|
| 10,241,745 B1* | 3/2019 | McDowell | G10H 1/14 |
| 11,996,816 B2* | 5/2024 | Craven | H03H 17/04 |
| 2021/0295809 A1* | 9/2021 | Reistrup | H02J 50/12 |
| 2023/0298547 A1* | 9/2023 | Kishi | G06Q 30/015 84/602 |
| 2023/0308732 A1* | 9/2023 | Morris | H04N 21/435 |

* cited by examiner

*Primary Examiner* — Khai Tran
(74) *Attorney, Agent, or Firm* — Weitzman Law Offices, LLC

(57) ABSTRACT

A system for processing audio signals is disclosed. The system comprises a computer with a digital audio workstation (DAW) software installed, an audio interface coupled to or integrated with the computer, an analog audio processor (AAP) hardware coupled to the audio interface. A digital audio stream from within the DAW software is converted, via the audio interface, to an analog audio signal, then routed through the AAP hardware for fully analog processing and altering, then converted back, via the audio interface, to an altered digital audio stream and finally routed back to the DAW software. The DAW software comprises an AAP plugin which controls a number of audio processing settings of the AAP hardware via a control connection between the AAP plugin and the AAP hardware. The AAP plugin comprises a digital signal processor (DSP) subroutine which applies digital audio effects on the previously altered digital audio stream.

9 Claims, 3 Drawing Sheets

SYSTEM AND METHOD FOR PROCESSING AUDIO SIGNALS

CROSS-REFERENCE TO RELATED APPLICATIONS

This application claims priority to European Pat. App. No. 22166126.7, filed Mar. 31, 2022 and also titled "System and method for processing audio signals", which is hereby incorporated by reference in its entirety.

FIELD OF INVENTION

The invention relates to a system for processing audio signals or streams. It also relates to a corresponding method.

BACKGROUND

Published European patent application EP 3 537 632 A1 recognizes that many audio engineers prefer using analog devices that work with analog signals over digital devices, believing that analog devices have better acoustic characteristics. However, a disadvantage with analog devices is that the user typically relies on memory each time new parameter settings are made. It is also difficult to store parameter changes as a function of time, and changing these values as a function of time involves dedicated personnel to mechanically change settings.

To this end said application discloses an analog device control system. The analog device control system has an analog device control module, comprising computer-executable code stored in non-volatile memory, a processor, and an analog device. The analog device control module, the processor, and the analog device are configured to use the analog device to receive an analog signal, digitally control the analog device using the analog device control module, and vary the analog signal using the analog device. Varying the analog signal is based on digitally controlling the analog device using the analog device control module.

BRIEF SUMMARY

One objective underlying the present invention is to further increase usability and functionality of said prior art system, while further maintaining audio quality, keeping the analog device simple, and making efficient use of hardware resources.

According to the invention, the objective is achieved by a system and corresponding method specified in the claims.

Therefore, according to the invention, a system for processing audio signals is disclosed, the system comprising a computer with a digital audio workstation (DAW) software installed (i.e. the computer together with the software realizes a DAW), an audio interface coupled to or integrated with the computer, an analog audio processor (AAP) hardware coupled to the audio interface, such that a digital audio stream from within the DAW software can be converted, via the audio interface, to an analog audio signal, then routed through the AAP hardware for fully analog processing and altering, then converted back, via the audio interface, to an altered digital audio stream and finally routed back to the DAW software, wherein the DAW software comprises an AAP plugin which controls a number of audio processing settings of the AAP hardware via a control connection between the AAP plugin and the AAP hardware, and wherein the AAP plugin comprises a digital signal processor (DSP) subroutine which is capable of applying digital audio effects on the previously altered digital audio stream, thereby further altering it digitally.

The invention is based on the idea of providing digital recall for an AAP hardware via a digital control plugin in an extended DAW environment, and at the same time adding to the plugin DSP functionality that actually additionally alters the audio signal despite the predominant analog processing before. Hence, on a conceptional level there is hybrid audio signal manipulation combining analog processing and DSP processing in one elegant, effective, and reliable system of highest audiophile quality. The plugin therefore has at least two purposes: firstly, controlling the analog hardware, secondly processing the digital signal in the DAW, and optionally analyzing the signal in the DAW, in particular with respect to DSP operations unrelated to analog processing.

This concept has a number of unexpected advantages:

The extended control plugin (i.e. the AAP plugin, also named DSP plugin when referring to the DSP functionality only) receives control and metering signals from both the analog hardware (i.e. the AAP hardware) and the DSP process, so that one can monitor and adjust both processes (that are in fact influencing each other) at the same time.

The user can narrow down the amount of space taken up on the screen of a graphical user interface to make audio signal manipulations.

The plugin also can double as a standalone DSP plugin without the need of using the analog hardware.

This integration improves a lot the creative process as the operator is concentrated only on one interface and not distracted by multiple instances of the processors needed elsewhere for audio editing.

The audio DSP process is very CPU consuming, so it is advantageous to unload some processes from the analog hardware to the DAW which is naturally equipped for CPU-intense processes, such as: signal detection, audio analysis for sidechain, FFT analysis, or machine learning. Therefore, it is no longer necessary to use heavy chips and complicated programming in the analog hardware, while at the same time less resource-intense audio processing like raw analog signal processing can be kept at the analog device (i.e. the AAP) for highest audiophile results.

Nowadays, most of music or similar audio content is published as digital, in particular via the internet (e.g. via streaming services). However, the AAP devices are analog ones on purpose. Because of that there may be some differences between analog metering and digital one. The solution described herein adds the possibility for a user to have digital accuracy of measurement or metering of the sound effects applied inside the analog device that corresponds to a song published digitally.

In a preferred embodiment the AAP plugin comprises a machine learning subroutine which collects and analyzes data based on user behavior depending on specific audio signals, and which, after some training period, offers or suggests or automatically applies settings for the AAP hardware and the DSP subroutine. Additionally, the machine learning subroutine may also collect and analyze data provided by other plugins, e.g. third-party plugins, which may be called or loaded by the DAW. For, example, in an expanded machine-learning scenario there may be third-party plugins to be applied alone or in sequence with the AAP plugin, and these third-party plugins may be collecting data, in particular, on user behavior, for their own uses. Preferably, the AAP plugin comprises suitable interfaces to communicate with the other plugins and to obtain access to their internal databases. This yields the possibility to use data collected by other plugins inside the AAP plugin for machine learning purposes. The entirety of the collected data may then be used to control and/or predict and/or automatically apply settings of the AAP hardware—and/or preferably of the AAP plugin (in particular of its digital subroutine) and/or the other plugins.

Advantageously, the DSP subroutine comprises a high-pass filter.

In a preferred embodiment, the DSP subroutine comprises a digital spectrum analyzer based on a fast Fourier transform algorithm.

The control connection is preferably established via an USB interface. However, Ethernet, Wi-Fi, Bluetooth or other wireless or cable-based interfaces or connections may generally be viable alternatives.

The computer is preferably a workstation, personal computer, a laptop, a tablet, a handheld, or a smartphone.

In a preferred embodiment the AAP plugin is configured to provide a control window on an associated computer screen, the control window comprising an AAP control area for metering and adjusting settings of the AAP hardware and a digital control area for metering and adjusting settings of the DSP subroutine.

Expediently, the AAP plugin further provides an analysis area which displays a graphical spectral analysis of the previously altered digital audio stream.

In a preferred extension of the basic idea not only the AAP hardware can be controlled by the DSP plugin or subroutine but also the operator (user) will be able to control through the physical AAP hardware interface (knobs, buttons, switches and/or sliders or similar control elements) the settings or parameters of the DSP plugin (i.e. the DSP subroutine of the AAP plugin within the DAW). For example, the user can set via a knob on the AAP hardware the cutoff of a digital high-pass filter or any other function build into the DSP subroutine. Hence, control can preferably happen in both directions of the established control connection: virtual control elements on a graphical user-interface of the DAW can set parameters of the associated analog hardware (i.e. AAP hardware), and physical control elements of the analog hardware can set parameters of the digital processing inside the DAW environment.

Furthermore, the invention provides a method for processing audio signals or streams, using a computer with a digital audio workstation (DAW) software installed, an audio interface coupled to or integrated with the computer, and an analog audio processor (AAP) hardware coupled to the audio interface, wherein a digital audio stream from within the DAW software is converted, via the audio interface, to an analog audio signal, then routed through the AAP hardware for fully analog processing and altering, then converted back, via the audio interface, to an altered digital audio stream and finally routed back to the DAW software, wherein the DAW software comprises an AAP plugin which controls a number of audio processing settings of the AAP hardware via a control connection between the AAP plugin and the AAP hardware, and wherein the AAP plugin comprises a digital signal processor (DSP) subroutine which applies digital audio effects on the previously altered digital audio stream, thereby further altering it digitally.

BRIEF DESCRIPTION OF THE DRAWINGS

An exemplary embodiment of the invention is subsequently discussed with reference to the accompanying drawings.

DETAILED DESCRIPTION OF THE DRAWINGS

The system described herein is an extension of the one described in EP 3 537 632 A1, which document is hereby incorporated in its entirety.

Figure 1:
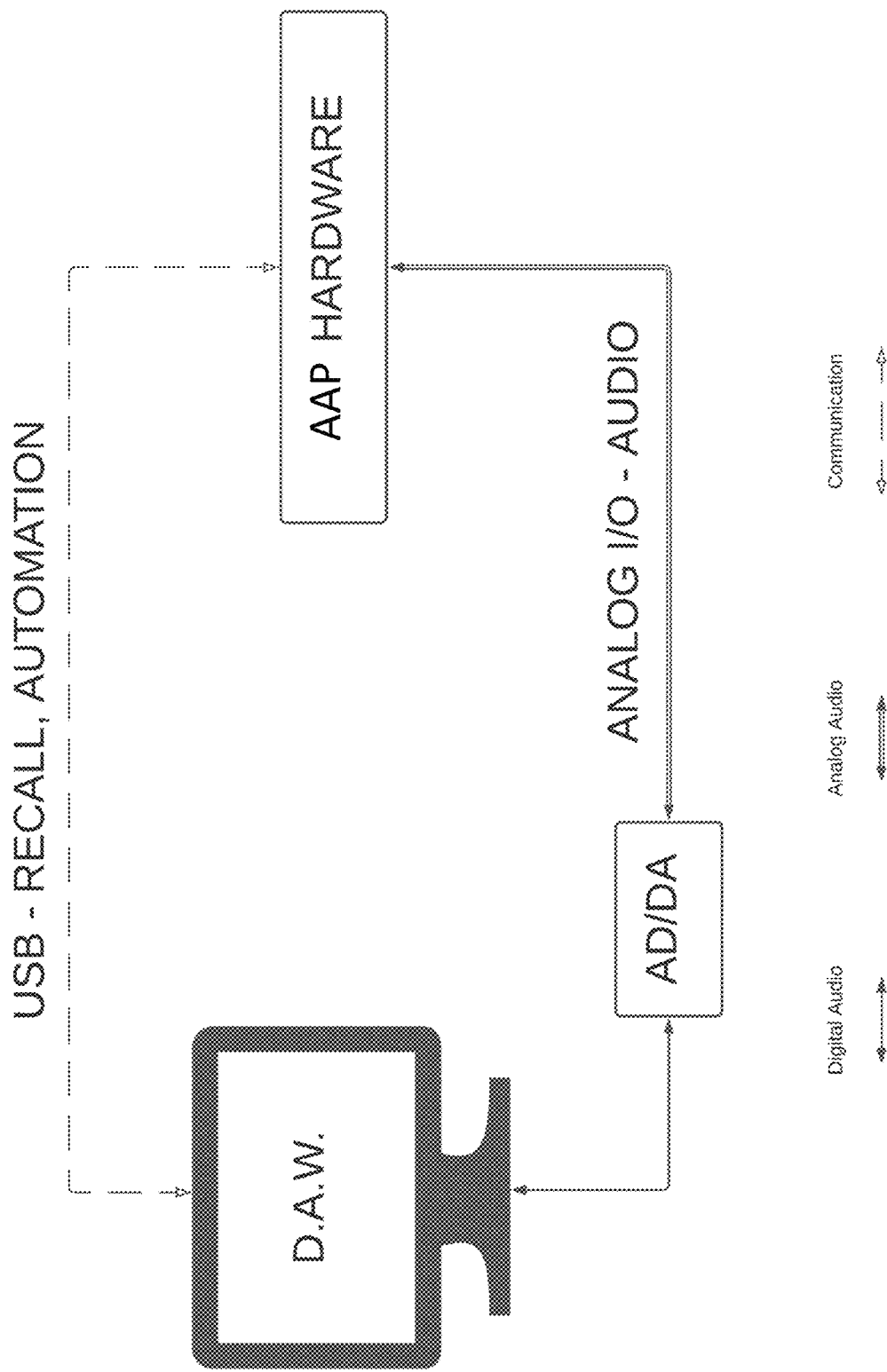
FIG. 1 shows a highly simplified schematic of a system for processing audio signals according to the invention.
Figure 2:
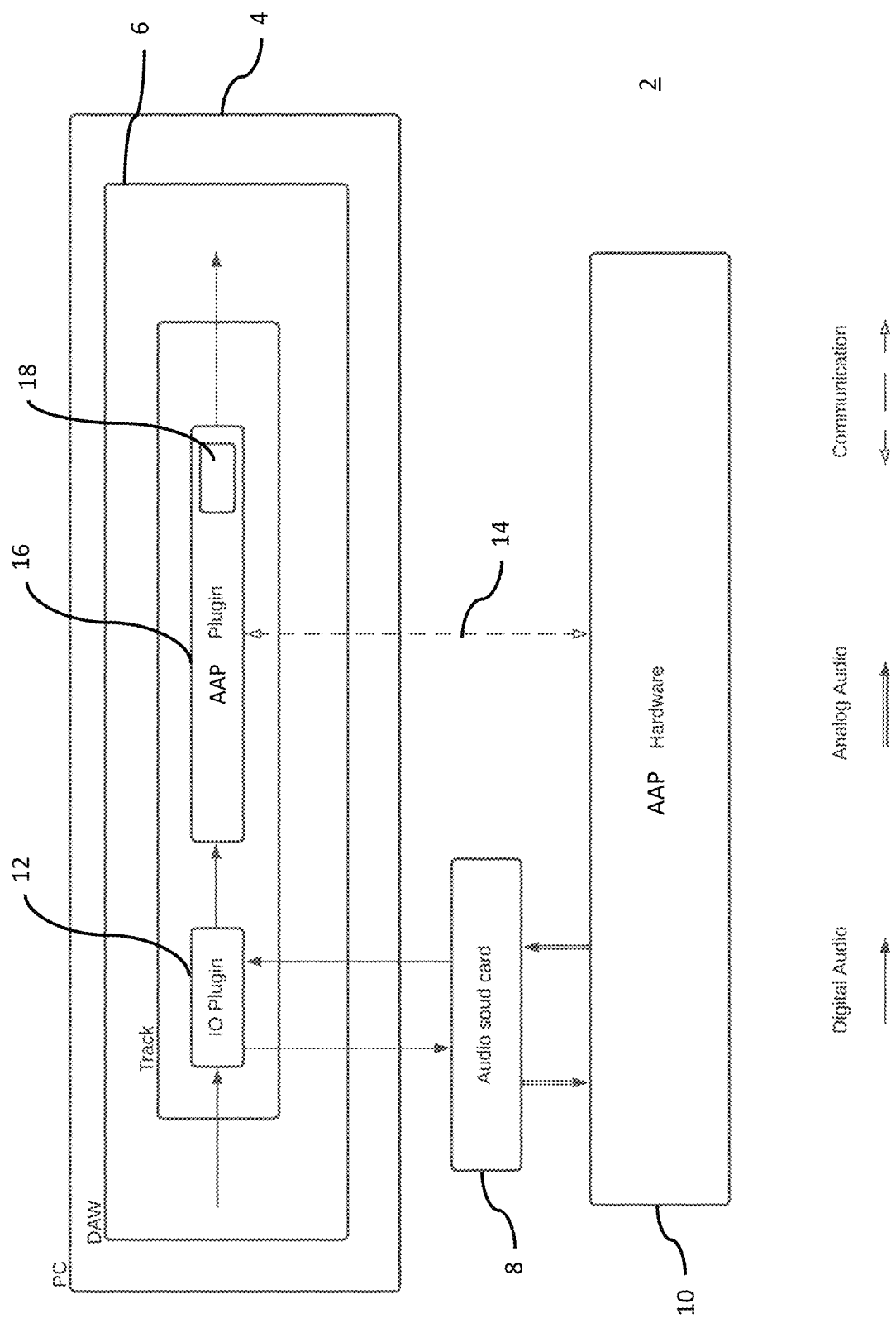
FIG. 2 shows a more detailed schematic of said system.

FIGS. 1 and 2 provide a schematic overview of a system 2 for processing audio signals. The system 2 comprises a computer 4 which may be a workstation, a personal computer (PC), a laptop, a tablet, a smartphone, or any other suitable device, preferably with a central processing unit (CPU), working storage, permanent storage, suitable input and output interfaces and related periphery devices, such as a build-in or external monitor or screen. The operation of the computer 4 is governed by an operating system software which allows for loading an executing application software 6, in particular a software bundle known as digital audio workstation (DAW) software for processing digital audio streams. DAW may also be the denomination of the computer 4 combined with the audio software. The system further comprises an audio interface 8, also known as sound board or sound card or analog-digital/digital-analog (AD/DA) converter for converting analog audio signals to digital audio streams and vice versa. While the audio interface 8 may be integral with the computer 4, it is preferably provided as an external device. The computer 4 and the audio interface 8 are preferably to be coupled via a universal serial bus (USB) interface with the help of suitable connectors. The audio interface 8 has a number of audio input ports for analog audio sources, such like a microphone or an instrument or an auxiliary (AUX) audio line. The audio interface 8 further comprises a number of audio output ports for corresponding audio output devices, such as audio speakers, studio monitors, or headphones. The may be more than one audio interface 8 of the kind described above.

During operation of the system 2, an analog audio signal (e.g. from an instrument or microphone) is converted into a digital audio stream by the audio interface 8 and is processed by the DAW software on the computer 4 (e.g. PC). The DAW has some build-in functionality which can be extended by third-party audio effect plugins, i.e. software modules which can be called or loaded by the main program. Each plugin, in combination with the computer hardware, acts as a digital signal processor (DSP). The DAW can therefore load a number of digital plugins for processing the digital audio stream. In particular, a number of DSP plugins may provide well-known audio effects like equalizer (EQ), compressor, reverb, and the like. The effects associated with the individual plugins are applied sequentially, in any suitable order chosen by the user as allowed by the application software 6. The original and the changed versions of the digital audio stream can be saved as digital audio files on the computer. Several tracks can be worked-on or processed simultaneously and mixed according to the user's wishes. For replay, the respective digital audio stream is sent back via the audio interface 8 to suitable speakers (e.g. studio monitors) or headphones.

The basic audio system described so far may be extended by a special analog audio processor (AAP) hardware 10. This is an analog device or hardware which acts upon an analog audio signal, i.e. provides fully analog audio processing. The AAP hardware 10 advantageously is a separate device. It comprises an audio input port which according to FIG. 2 is connected to an audio output port of the audio interface 8. Similarly, the AAP hardware 10 comprises an audio output port which is connected to an audio input port of the audio interface 8. This way, a digital audio stream from within the DAW can be converted into an analog audio signal by the audio interface 8, then routed through the AAP hardware 10, analogously processed therein, and finally converted back into a digital audio stream via the audio interface 8. The corresponding audio loop through the AAP hardware 10 which originates and terminates at an input-output (10) plugin 12 of the DAW software is indicated schematically in the left half of FIG. 2. Digital audio streams are indicated by single arrows, analog audio signals are indicated by double arrows. The 10 plugin 12 used to address the AAP hardware 10 may be build-in functionality of the DAW software or may be provided as a third-party plugin.

Thus, a digitally recorded audio stream within the DAW may be sent, after conversion to an analog audio signal, to the AAP hardware 10 for fully analog audio processing with superior processing characteristics. This may include well-known audio effects like EQ, passive filters, and the like. After analog processing and back-conversion to the digital regime, the thus-manipulated digital audio stream may be further processed by the DAW software. This includes digital processing by corresponding DSP plugins, to be applied in a sequential manner.

Usually, the AAP hardware 10 has its own physical (hardware) settings-interface with corresponding control knobs, sliders, switches, control lights, and the like for adjusting settings of the analog audio processing in this device. In order to provide a more convenient user interface and also to allow for recall and/or automation of settings, there is a control connection 14, established for example via a USB interface, between the AAP hardware 10 and a corresponding control plugin within the DAW. The control plugin preferably provides, among others, a virtual replica of the physical AAP settings interface plus associated automation tools for digital recall and automation of AAP settings. A corresponding (bi-directional) communication or control channel is indicated in FIG. 2 by the dashed arrow. A suitable AD/DA interface for the control connection 14 may conveniently be integrated into the AAP hardware 10.

In a basic system design, the control plugin merely controls the AAP hardware 10 but does not act on the digital audio stream, i.e. does not operate as a DSP. However, according to the invention, a new AAP plugin 16 to be called by the DAW software acts as a combined control and digital effects plugin, therefore providing hybrid (digital plus analog) audio manipulation. That is, the AAP plugin 16 does not merely control the settings of the AAP hardware 10 but also applies digital effects on the digital audio stream generated from the AAP hardware's 10 output.

As explained previously, a digital audio stream processed by the DAW is routed by the IO plugin 12 via the audio interface 8 through to the AAP hardware 10 for analog audio processing. Afterwards, the thus-processed audio signal is lead back via the audio interface 8 and the IO plugin 12 as a digital audio stream into the DAW software. The digital audio steam is then processed, i.e. generally digitally altered, by the AAP plugin 16 which preferably incudes a DSP subroutine 18 or submodule with suitable digital audio effects. By way of example, the DSP operation provided by said subroutine, may comprise a high-pass filter. If necessary or desired, the thus-processed digital audio stream may afterwards be processed by a number of separate third-party plugins in sequential plugin stack of the DAW. But this last step is purely optional and is preferably not required since the AAP plugin 16 itself may provide the necessary digital effects to be applied.

Furthermore, the AAP plugin 16 may provide digital analysis of said digital audio stream. For example, it may comprise a digital fast Fourier transform (FFT) subroutine for spectral analysis of of the audio signal represented by the digital audio stream. The analysis may be applied to the input digital audio stream entering the AAP plugin 16, that is before application of the DSP effects. Alternatively or additionally, the analysis may be applied after application of the DSP effects, that is on the output digital audio stream leaving the AAP plugin 16.

As described earlier, the digital AAP plugin 16 also controls the AAP hardware 10 via an associated control connection 14, established for example via USB, Lightning, or similar interface. More specifically, the AAP plugin 16 facilitates digital recall and automation of audio processing settings applied by the AAP hardware 10. That is, with the help of a suitable graphical user interface the user can save and load various settings of the AAP plugin 16 which correspond to physical settings of the AAP hardware 10. This means, the user does not have to remember a multitude of these hardware settings and turn knobs and set sliders of the AAP hardware 10 accordingly—rather the user can simply load corresponding settings or preferences in the AAP plugin 16, which, via the established control connection 14, sets the hardware settings of the AAP hardware 10 accordingly. These recallable settings preferably also comprise digital settings of the DSP subroutine 18 or submodule of the AAP plugin 16, e.g. digital filter settings or FFT analyzer settings.

In a preferred embodiment the AAP plugin 16 comprises a machine learning submodule or artificial intelligence (AI) submodule. This way, the AAP plugin 16 can and will collect data based on the user behavior depending on specific audio signals or digital audio streams. It will monitor the decision-making process based on the incoming signal(s) and in the future, after some training phase, offer settings by itself of both AAP hardware 10 settings and DSP settings (in particular digital audio effects settings) with respect to the DSP subroutine 18 integrated into the AAP plugin 16.

Figure 3:
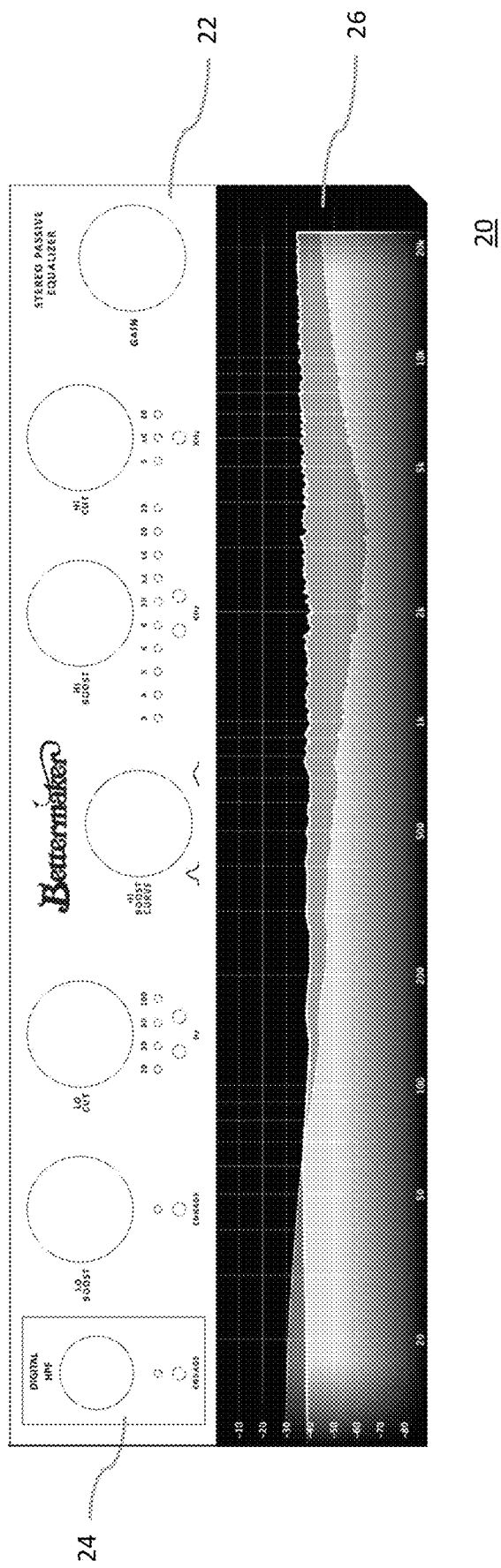
FIG. 3 shows a screenshot of a graphical user interface for adjusting various settings of said system.

A schematic screenshot of a control window 20 provided by the AAP plugin 16 on a computer screen is shown in FIG. 3. Basically, the control window 20 is divided into three different areas:

Firstly, the AAP control area 22 comprises a number of digital control elements for adjusting, loading, and saving settings of the AAP hardware 10. This may be a one-to-one, or altered, or digitally enhanced virtual replica of a physical settings interface of the AAP hardware 10, e.g. with number of virtual EQ control knobs. Alternatively, the AAP hardware 10 comprises no physical settings interface on its own or just a reduced version of it. In any way, AAP control area 22 is the preferred or main interface for controlling the AAP hardware 10.

Secondly, the digital control 24 area provides control elements for adjusting, loading, and saving settings of the DSP subroutine 18 integrated into the AAP plugin 16. By way of example, this includes a virtual switch and control knob for a high-pass filter (HPF).

Thirdly, there is an analysis area 26, by way of example showing a graphical spectrum of the output audio signal at the end of the plugin stack. That is, the graphic representation shows the combined results of audio processing in the analog signal chain of the AAP hardware 10 and the subsequent digital processing in the AAP plugin's 16 own DSP subroutine 18. In other words, the analysis area 26 graphically depicts the combined effects of the settings applied both in the AAP control area 22 and the digital control area 24. As the hardware and DSP effects are integrated in to one plugin, AAP plugin 16, one can immediately see and hear effects of both effects without need to interchange the processing plugins.

LIST OF REFERENCE NUMERALS 2 system
4 computer
6 software
8 audio interface
10 AAP hardware
12 IO plugin
14 control connection
16 AAP plugin
18 DSP subroutine
20 control window
22 AAP control area
24 digital control area
26 analysis area

What is claimed is:

1. A system for processing audio signals, comprising:
a computer with a digital audioworkstation (DAW) software installed,
an audio interface coupled to or integrated with the computer, and
an analog audio processor (AAP) hardware coupled to the audio interface,
    such that a digital audio stream from within the DAW software is converted, via the audio interface, to an analog audio signal, then routed through the AAP hardware for fully analog processing and altering, then converted back, via the audio interface, to an altered digital audio stream and finally routed back to the DAW software,
wherein the DAW software comprises an AAP plugin which controls a number of audio processing settings of the AAP hardware via a control connection between the AAP plugin and the AAP hardware,
wherein the AAP plugin comprises a digital signal processor (DSP) subroutine which is capable of applying digital audio effects on the previously altered digital audio stream, thereby further altering it digitally, and
wherein the AAP plugin comprises a machine learning subroutine which collects and analyzes data based on user behavior depending on specific audio signals, and which, after some training period, offers or suggests or automatically applies settings for the AAP hardware and the DSP subroutine.

2. A system for processing audio signals, comprising:
a computer with a digital audioworkstation (DAW) software installed,
an audio interface coupled to or integrated with the computer, and
an analog audio processor (AAP) hardware coupled to the audio interface,
    such that a digital audio stream from within the DAW software is converted, via the audio interface, to an analog audio signal, then routed through the AAP hardware for fully analog processing and altering, then converted back, via the audio interface, to an altered digital audio stream and finally routed back to the DAW software,
wherein the DAW software comprises an AAP plugin which controls a number of audio processing settings of the AAP hardware via a control connection between the AAP plugin and the AAP hardware,
wherein the AAP plugin comprises a digital signal processor (DSP) subroutine which is capable of applying digital audio effects on the previously altered digital audio stream, thereby further altering it digitally, and
wherein the DSP subroutine comprises a high-pass filter.

3. A system for processing audio signals, comprising:
a computer with a digital audioworkstation (DAW) software installed,
an audio interface coupled to or integrated with the computer, and
an analog audio processor (AAP) hardware coupled to the audio interface,
    such that a digital audio stream from within the DAW software is converted, via the audio interface, to an analog audio signal, then routed through the AAP hardware for fully analog processing and altering, then converted back, via the audio interface, to an altered digital audio stream and finally routed back to the DAW software,
wherein the DAW software comprises an AAP plugin which controls a number of audio processing settings of the AAP hardware via a control connection between the AAP plugin and the AAP hardware,
wherein the AAP plugin comprises a digital signal processor (DSP) subroutine which is capable of applying digital audio effects on the previously altered digital audio stream, thereby further altering it digitally, and
wherein the DSP subroutine comprises a digital spectrum analyzer based on a fast Fourier transform algorithm.

4. The system of claim 1, wherein the control connection is established via an USB interface.

5. The system of claim 1, wherein the computer is a workstation, personal computer, a laptop, a tablet, a handheld, or a smartphone.

6. A system for processing audio signals, comprising:
a computer with a digital audioworkstation (DAW) software installed,
an audio interface coupled to or integrated with the computer, and
an analog audio processor (AAP) hardware coupled to the audio interface,
    such that a digital audio stream from within the DAW software is converted, via the audio interface, to an analog audio signal, then routed through the AAP hardware for fully analog processing and altering, then converted back, via the audio interface, to an altered digital audio stream and finally routed back to the DAW software,
wherein the DAW software comprises an AAP plugin which controls a number of audio processing settings of the AAP hardware via a control connection between the AAP plugin and the AAP hardware,
wherein the AAP plugin comprises a digital signal processor (DSP) subroutine which is capable of applying digital audio effects on the previously altered digital audio stream, thereby further altering it digitally, and
wherein the AAP plugin is configured to provide a control window on an associated computer screen, the control window comprising an AAP control area for metering and adjusting settings of the AAP hardware and a digital control area for metering and adjusting settings of the DSP subroutine.

7. The system of claim 6, wherein the AAP plugin further provides an analysis area which displays a graphical spectral analysis of the previously altered digital audio stream.

8. The system of claim 1, which is configured such that parameters of the DSP subroutine can be set via a number of physical control elements of the AAP hardware.

9. A method for processing audio signals, using a computer with a digital audio workstation (DAW) software installed, an audio interface coupled to or integrated with the computer, and an analog audio processor (AAP) hardware coupled to the audio interface, comprising:

converting a digital audio stream from within the DAW software, via the audio interface, to an analog audio signal, then routing the analog audio signal through the AAP hardware for fully analog processing and altering, then converting the analog audio signal back, via the audio interface, to an altered digital audio stream and finally routing the altered digital audio stream back to the DAW software, wherein the DAW software comprises an AAP plugin which controls a number of audio processing settings of the AAP hardware via a control connection between the AAP plugin and the AAP hardware, wherein the AAP plugin comprises a digital signal processor (DSP) subroutine which applies digital audio effects on the previously altered digital audio stream, thereby further altering it digitally, and wherein the AAP plugin comprises a machine learning subroutine which collects and analyzes data based on user behavior depending on specific audio signals, and which, after some training period, offers or suggests or automatically applies settings for the AAP hardware and the DSP subroutine.

* * * * *